Oct. 26, 1965    W. J. McINTYRE    3,213,867
SEED TREATMENT MACHINE
Filed Nov. 21, 1962    3 Sheets-Sheet 1

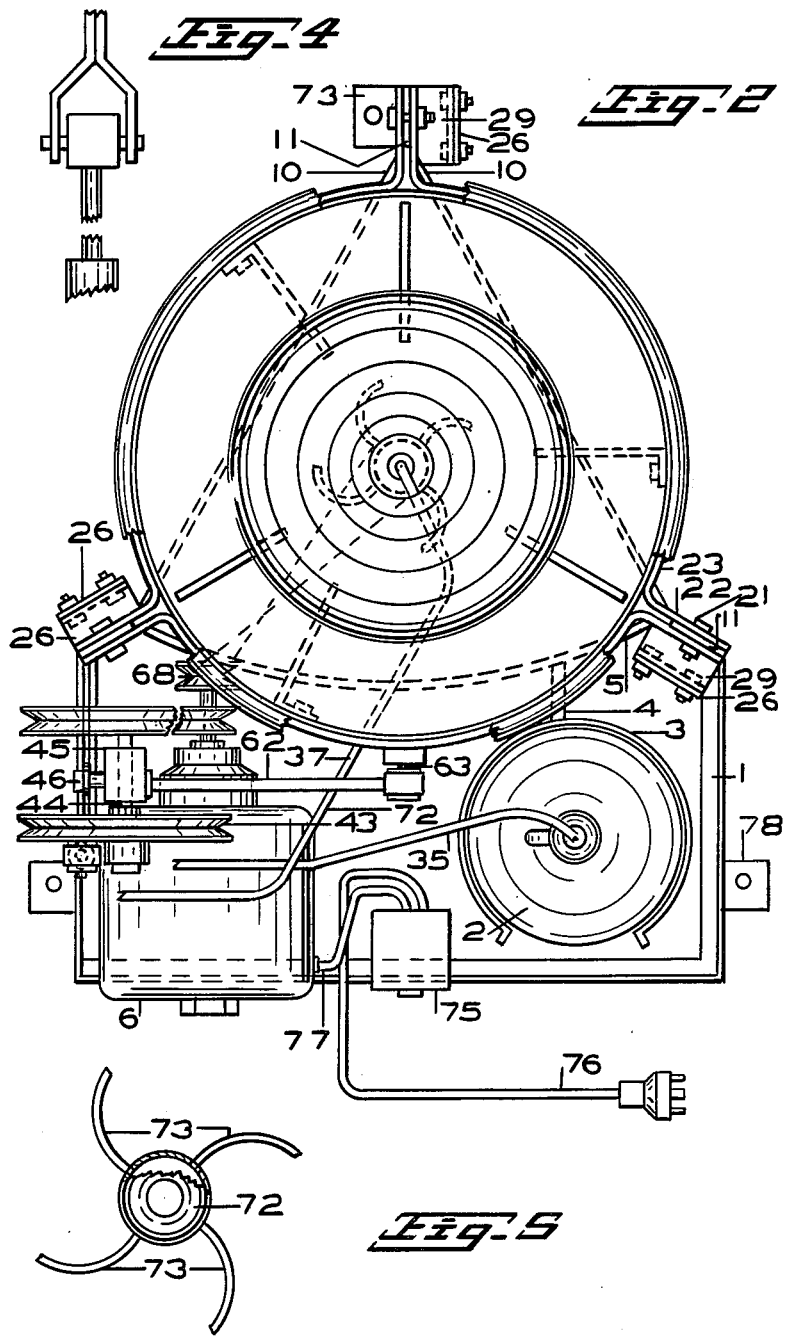

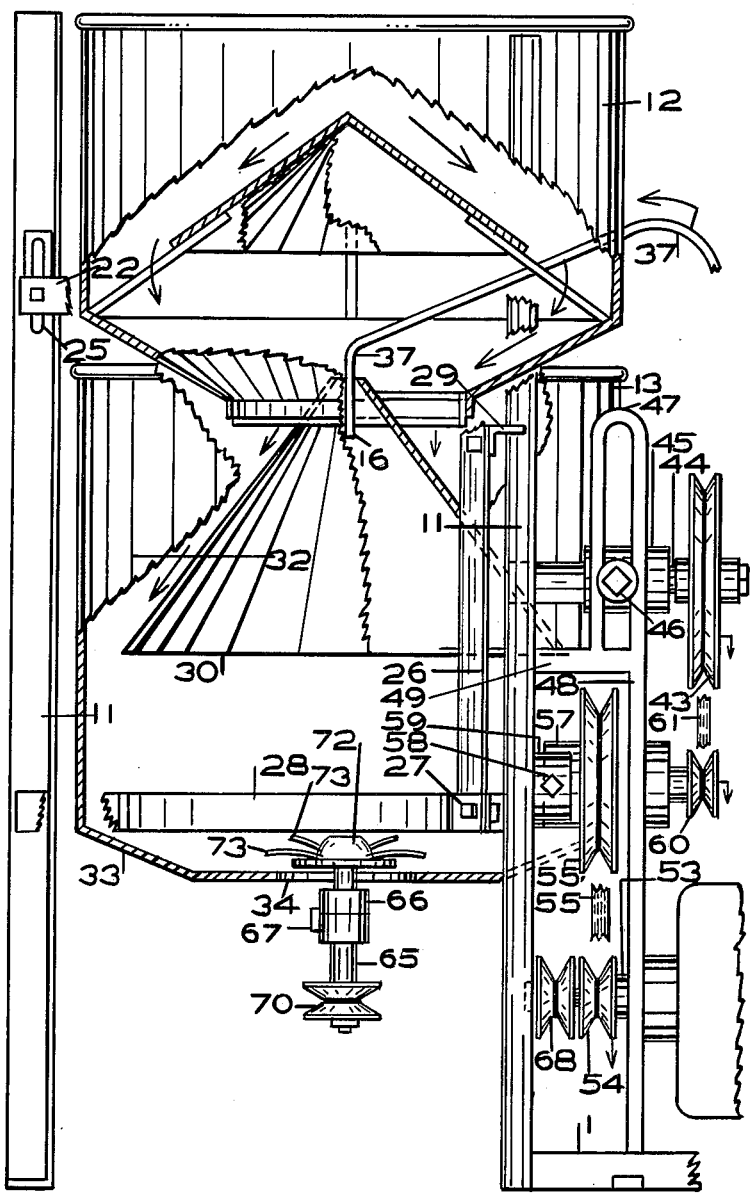

United States Patent Office 3,213,867
Patented Oct. 26, 1965

3,213,867
SEED TREATMENT MACHINE
William John McIntyre, P.O. Box 100, Swift Current,
Saskatchewan, Canada
Filed Nov. 21, 1962, Ser. No. 239,287
1 Claim. (Cl. 134—172)

This invention relates to grain treatment machines, having particular reference to a machine for treating seed grain with a liquid chemical.

In the art to which the invention relates, seed treatment machines of this character more usually use an inverted spreader cone over which the seed is passed and a liquid chemical spray directed on to the seed as it discharges from the cone. In this the spray is unevenly distributed over the seed and the sides of the container become coated with the spray, for which latter various means for cleaning the container walls have been devised.

The present invention is concerned with seed treatment machines using liquid chemicals in the treatment of the seed, and in which superimposed primary and secondary casings are used, the primary casing having a conical spreader over which seed delivered to the casing is passed, and the secondary casing having a further conical spreader over which seed discharging from the primary casing is passed, and this casing is subjected to an abbreviated gyratory back and forth movement, using the seed passing through the casing for removing liquid chemical adhering to the inside of the casing. The liquid chemical for treatment of the seed is injected into the secondary casing downward against a distributor rotating at high speed that throws the liquid outward in extremely fine droplets against the falling seed.

Other features and advantages of the invention will become apparent by reference to the accompanying description taken in conjunction with the drawings.

In the drawings, wherein is illustrated a preferred embodiment of the invention.

FIG. 2 is a top plan view of the machine, taken on a line 2—2 of FIGURE 1, shown with the upper casing broken away in parts.

FIG. 3 is a side view of the machine taken on a line 3—3 of FIGURE 1, but indicating the direction of movement of the seed through the machine by arrows, and with parts of the machine broken away and parts in section.

FIG. 4 is a side view showing the connection between the pump crank arm and piston rod, with the crank arm and piston rod broken away.

FIG. 5 is a top view with parts broken away of the liquid scattering bowl.

Figure 1:
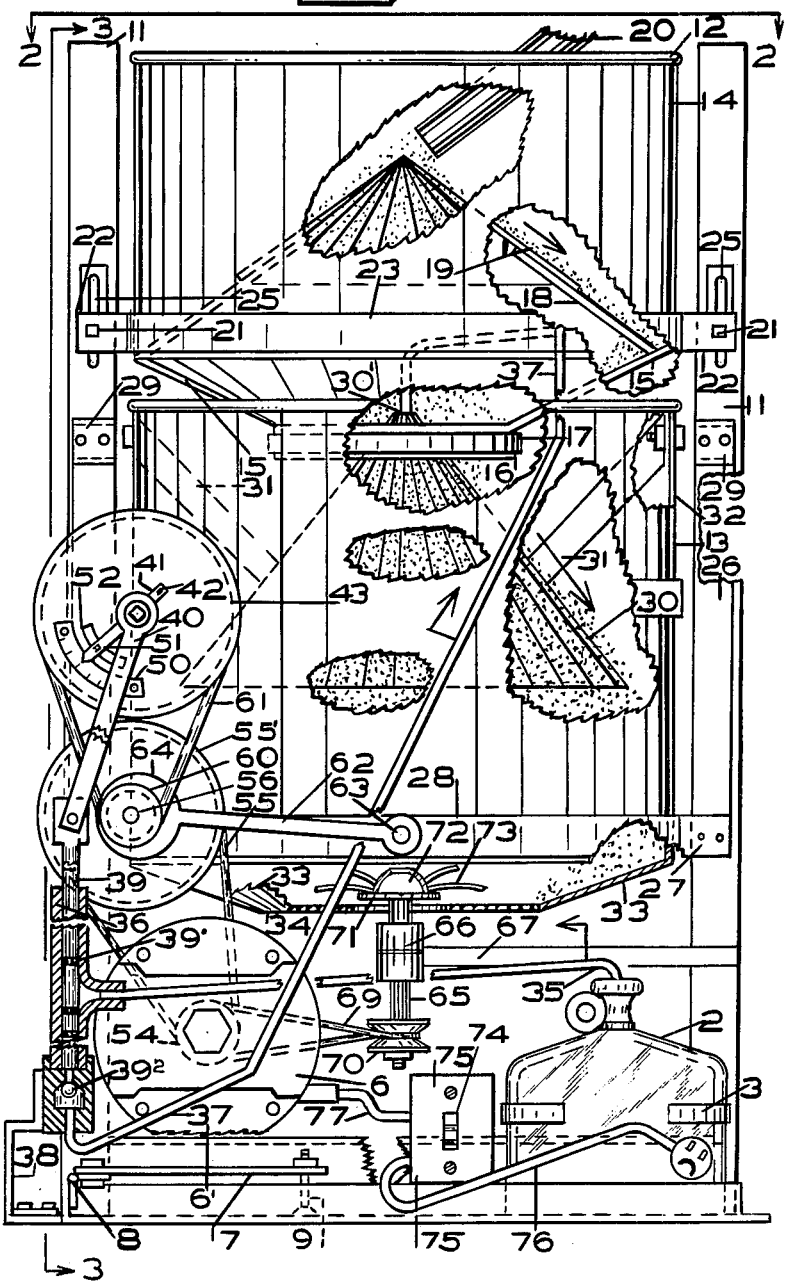
FIG. 1 is a front view of a seed treatment machine embodying my improvements and illustrating the passage of seed through the treatment casings, parts of the casings being shown broken away to disclose interiors of the casings and parts shown in section.

Having reference to the drawings the frame for carrying the working parts of the machine includes a base 1 of angle iron (FIG. 2) for the motors and the chemical liquid container. On this is set a container 2 held by arms 3 attached by a bracket 4 to a rear frame cross bar 5. The base also supports a motor 6 for driving the machine mechanism, the motor being mounted on a base $6^1$ carried on a platform 7 (FIG. 1) pivoted at one side by a hinge 8 to the base 1 and at the other side engaging an upstanding bolt 9 serving thereby as a belt tightener.

To the rear sides of the base attach arms 10 (FIG. 2) that converge rearwardly, and these arms and the rear sides of the base carry fixed thereto three uprights 11 that carry the seed treatment casings, there being two casings, an upper primary casing 12 and a lower secondary casing 13, with the casings disposed one above the other.

The primary casing 12 consists of a cylindrical side wall 14 (FIG. 1) with an inverted frusto-conical shaped bottom 15 (FIG. 3) having an outlet at 16 reinforced by a band 17. Within the casing are fixed, as by welding, three inwardly directed rods 18 that support a cone 19 on which the seed to be treated is spread, the seed discharging on to the cone from an auger pipe 20 (FIG. 1), by which the flow of seed may be regulated to avoid over filling the hopper and to ensure even discharge of the seed into the casing. It is to be understood the seed can be manually fed to the hopper, or gravity fed by a pipe leading from a bin, or any other suitable method used in moving seed.

The casing 12 is mounted on the uprights 11 by bolts 21 (FIGS. 1 and 2) engaging bent ends 22 of band sections 23 on the lower end of the casing, the bolts engaging vertical slots 25 in the uprights to permit vertical adjustment of the casing on the uprights.

Further supported by the uprights 11 is the secondary casing 13 in which the seed is to be treated. This casing is suspended from the uprights by spring steel straps 26 (FIGS. 1 and 3) that attach to bent ends 27 of band sections 28, these band sections, like the band sections 23, combining to form a band engaging the lower end of the casing. The straps 26 are attached bolted at their upper ends to brackets 29 (FIG. 3) that are fixed, as by welding, to the uprights.

Within the casing 13 is suspended a cone 30 (FIGS. 1 and 3) projecting into the open end 16 formed by the band 17 at the lower end of the casing 12, the cone attaching by arms 31 (FIG. 1) to the side wall 32 of the casing.

The lower end of the casing 13 has an integral inwardly inclined bottom 33 (FIG. 3) with an outlet opening at 34 for discharge of the treated seed.

The liquid for treatment of the seed is carried by a tube 35 inserted in the container 2, the tube connecting to the intake of a pump 36 that discharges through a tube 37 having its outlet within the cone 30, the tube passing through a suitable opening in the casing 12 and an opening $30^1$ (FIG. 1) in the top of the cone. The pump 36 includes a piston rod 39 with rings 39' and check valve $39^2$. The piston rod is pivotally connected to a crank arm 40 that pivotally attaches to a hand 41 (FIG. 1) that is pivoted at 42 to a pulley wheel 43 rotatable on a shaft 44 carried by a bearing 45 attached by a bolt 46 to a slotted arm 47 mounted supported on an upright 48 (FIG. 3) and an arm 49 to a frame upright 11, the bearing being vertically adjustable in the arm 47 for belt tightening. The hand 41 is movable in relation to a dial 50 and has a set screw 51 engaging the pulley wheel through a slot 52 by which the hand may be secured in an adjusted position along the slot. In view of the off center attachment of the hand 41 to the pulley wheel 43 the stroke of the piston rod 39 may be shortened or lengthened and the rate of flow of the liquid controlled accordingly.

The pulley wheel 43 is driven by the motor 6 through the drive shaft 53 (FIG. 3) of the motor, which has a pulley wheel 54 connected in driving relation to the pulley wheel 43 by a belt 55 trained over a pulley wheel $55^1$ on a shaft 56 (FIG. 1) mounted for rotation in a bearing element 57 (FIG. 3) attached by a set screw 58 fixed on a stub shaft 59 that is attached by any suitable means to an upright 11. On the shaft 56 is a further pulley wheel 60 connected by a belt 61 in driving relation to the pulley wheel 43.

The secondary casing 13 is mounted for vibratory gyrating movement suspended by the straps 26 and for effecting this movement an arm 62 (FIGS. 1 and 2) is pivotally connected on an outwardly projecting stud 63 fixed to the lower band formed by the sections 28 on the casing. The arm 62 pivotally attaches to an eccentric 64 (FIG. 1) on the shaft 56. Movement of the arm 62 is designed to impart an abbreviated gyratory movement to the casing 13, preferably with the eccentric turning at about 500 revolutions to the minute and the arm travelling about one quarter of an inch on each stroke.

For scattering the treatment liquid to effectively cover the seed a vertical shaft 65 is provided (FIGS. 1 and 3) mounted for rotation in a bearing sleeve 66 on a bar 67 fixed to an upright 11 (FIG. 3) extending inwardly. The shaft 65 is driven at high speed, preferably about three thousand revolutions per minute, by a pulley wheel 68 on the motor shaft 53 (FIG. 3) by a belt 69 trained over a pulley wheel 70 on the shaft 65.

On the upper end portion of the shaft 65 is fixed a plate 71 on which is mounted a bowl 72 having an open upper side through which liquid from the pipe 37 drips into the bowl. The bowl 72 has four radially projecting tubes 73 attached thereto communicating with the interior of the bowl on a common level and through which the liquid in the bowl is discharged in an equal quantity through each tube. The tubes are arranged to discharge the liquid at various levels against seed falling through the casing 13, one of the tubes turning upward about an inch relative to a horizontal level, one downward about an inch, and the remaining two tubes being directed between these two extremes one higher than the other and the four tubes evenly spaced as to their outlets.

The motor 65 is controlled by a switch 74 in a switch box 75 to which a lead line 76 delivers current, and this is carried by a lead 77 to the motor.

The seed treatment machine may be secured to a floor by lugs 78 on the base 1 and base arms 10.

In the use of the machine the seed to be treated is delivered from the auger pipe 20 over the spreader cone 19 from where it is directed inward over the inverted conical bottom 15 of the primary casing 12. The seed then passes through the outlet 16 of the bottom 18 of the casing on to the secondary casing cone 30, and from there to the inverted conical bottom 33 of the secondary casing 13, discharging from this casing through the outlet 34.

The liquid from the container 2 is pumped through the pipe 37 and discharges downward through the opening 30¹ of the cone 30 into the bowl 72 on the plate 71 that is driven from the motor 6. This bowl, travelling at high speed, converts the liquid into a fine spray directed outwardly through the tubes 73 over the seed falling from the conical spreader 30 on to the inwardly turned bottom 33 of the casing, so that as the grain falls on to the bottom 33 and is bounced inwardly it is thoroughly covered by the spray of liquid. The flow of liquid from the pump may be regulated by moving the hand 41 to increase or decrease the length of the stroke of the piston rod 39.

At the same time the arm 62 is being actuated by the eccentric 64 to impart the gyratory movement to the casing 13, so that the falling and tumbling seed scrapes the lower sides of the casing and casing bottom, removing therefrom any liquid chemical adhering thereto that was thrown outward by the plate 71, and by this aiding in the treatment of the seed and keeping the container cleaned of liquid that would otherwise adhere to it.

It is important also that the flow of seed through the treatment casing 13 be uniform and well distributed so as to effectively be coated by the treatment liquid. This is primarily done by the rate of discharge of the seed on to the upper conical spreader 19. Further regulation of the flow of seed is obtained by vertical adjustment of the upper casing 12 in relation to the lower casing 13 by means of the bolts 21 in the slots 25, such adjustment moving the band 17 up or down in relation to the cone 30 and thereby increasing or decreasing the capacity of the opening between the band and cone.

The passing of the seed over the cone 19, inward over the bottom 15 of the casing 12, then outward again over the cone 30 and inward over the bottom 33 of the casing 13 ensures even spreading of the seed to be most effectively treated.

An important feature relating to this is the gyratory movement imparted to the lower casing. This, by virtue of the fact that it moves back and forth, keeps the seed flowing much more evenly than if there was no such movement, making possible an even flow of the seed that is essential to its uniform treatment, and avoids any clogging of the seed in the casings and on the spreaders.

I claim:

A seed treatment machine having a frame including uprights, a primary casing having a cylindrical wall and an open upper side and an inverted frusto-conical under side, the under side having a central outlet, means mounting the casing on the uprights to be vertically adjusted thereon, a conical spreader mounted in the primary casing with its apex uppermost, said spreader having a diameter less than the diameter of said casing, an inlet pipe associated with said casing for delivery of grain on to the apex of said spreader, a secondary casing having a cylindrical side wall and an inverted frusto-conical bottom with a central outlet, means mounting the secondary casing on the uprights to position same below the primary casing, said means comprising band sections embracing the lower end of the secondary casing, straps extending upwardly and attached at their upper ends to the uprights and at their lower ends to the band sections thus suspending the secondary casing, a conical spreader suspended in the secondary casing with its apex uppermost, said latter spreader having its upper end projecting into the outlet in the bottom of the primary casing by which vertical adjustment of the primary casing on the uprights regulates the flow of grain from the primary casing, and said latter spreader having a base diameter less than the diameter of the secondary casing, a source of chemical liquid carried by the casing and means for discharging said liquid downward through the apex of the spreader in the secondary casing, a motor driven bowl rotatably mounted on the machine frame and positioned within the secondary casing at the bottom thereof to receive liquid discharging through the secondary casing spreader, said bowl having outlets by which when the bowl is rotated at high speed a fine spray is discharged on to seed grain passing through the secondary casing, and motor driven means mounted in the machine frame and connected to the lower part of the secondary casing for imparting a gyratory movement to the secondary casing.

References Cited by the Examiner

UNITED STATES PATENTS

| | | | |
|---|---|---|---|
| 2,319,865 | 5/43 | James | 118—303 |
| 2,862,511 | 12/58 | Forsberg | 239—223 X |
| 2,917,241 | 12/59 | Waldrum | 239—223 X |
| 2,932,275 | 4/60 | Bauer | 118—303 X |
| 2,990,807 | 7/61 | Gerow | 118—303 X |

DANIEL BLUM, *Primary Examiner.*

RICHARD D. NEVIUS, CHARLES A. WILLMUTH,
*Examiners.*